United States Patent Office 3,282,967
Patented Nov. 1, 1966

3,282,967
ACYLATED TETRAMINO-DIHALO-
ANTHRAQUINONES
Paul Grossmann, Binningen, Switzerland, assignor to Ciba
Limited, Basel, Switzerland
No Drawing. Original application May 1, 1962, Ser. No.
191,444, now Patent No. 3,234,234, dated Feb. 8, 1966.
Divided and this application May 10, 1965, Ser. No.
454,733
Claims priority, application Switzerland, May 10, 1961,
5,487/61
4 Claims. (Cl. 260—377)

This application is a division of application Serial No. 191,444, filed May 1, 1962, now Patent No. 3,234,234.

The present invention provides diacylated 1:4:5:8-tetramino-anthraquinones of the formula (1)

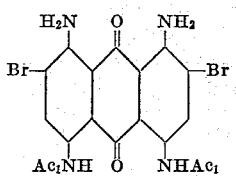

or (2)

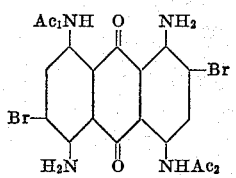

in which $Ac_1$ represents the radical of an aliphatic carboxylic acid, advantageously one containing at most 8 carbon atoms, or the radical of a semi-ester of carbonic acid, $Ac_2$ represents the radical of an aliphatic carboxylic acid or the radical of a semi-ester of carbonic acid or the radical of a benzene carboxylic acid or the radical of a benzene sulfonic acid.

The invention also provides a process for the manufacture of the new dyestuffs, wherein an α:α-diaminoanthraquinone which contains a halogen atom in orthoposition to at least one primary amino group and substituents convertible into acylamino groups in para-position to the amino groups, is treated in one or more stages to convert into acylamino groups the substituents so convertible.

The diamino-anthraquinones used in the process of the invention advantageously contain primary amino groups. The starting materials also contain halogen atoms, for example, chlorine or especially bromine atoms, in orthoposition to at least one, advantageously to both amino groups. They also contain a substituent convertible into an acylamino group in para-position to each amino group. As such substituents there may be mentioned more especially halogen atoms, for example, chlorine and especially bromine. Such compounds may be obtained by the tri- or tetra-halogenation of 1:5- or 1:8-diamino-anthraquinones, for example, 1:5- or 1:8-diamino-anthraquinone, by reacting the tri- or tetra-halogen-diamino-anthraquinones with 2 mols of a benzene sulfonamide to form mono- or di-halogen-diaminobenzenesulfonylamino-anthraquinones. This reaction is advantageously carried out in an organic solvent, for example, an aliphatic alcohol, such as butyl, amyl or hexylalcohol, advantageously in the presence of an agent capable of binding acid, such as alkali metal acetate, alkali metal carbonate or alkaline earth metal carbonate, and a copper compound, such as copper oxide or copper carbonate.

One or both of the benzene-sulfonylamide groups in the disulfonyl-tetra-amino-anthraquinones so obtained may be hydrolyzed to form the free amino groups, and the latter may be acylated by reaction with agents capable of introducing the radical of a carboxylic acid. If the intermediate product contains two acylatable amino groups, it may be reacted with 2 mols of an agent yielding the radical of an aliphatic mono- carboxylic acid or of a carbonic acid semi-ester, or with 1 mol of an agent yielding the radical of an aliphatic carboxylic acid or of a carbonic acid semi-ester and 1 mol of an agent yielding the radical of a different aliphatic carboxylic acid or the radical of a carbonic acid semi-ester or the radical of a benzene-carboxylic acid. As acylating agents there are used, for example, formic acid or advantageously the carboxylic acid halides, especially the chlorides of aliphatic or cycloaliphatic carboxylic acids containing at most 8 carbon atoms, for example, of acetic acid, of propionic acid, of butyric acid, of valeric acid, of caproic acid or of caprylic acid, or cycloaliphatic carboxylic acids, such as hexahydrobenzoic acid, or unsaturated aliphatic carboxylic acids, such as acrylic acid or crotonic acid, or substituted carboxylic acids, especially those substituted by halogen atoms, such as chloracetic acid or γ-chlorobutyric acid and, finally, semi-esters of carbonic acid, for example, carbonic acid methyl ester or carbonic acid ethyl ester, which are not stable as such, but their halides are also acylating agents.

Instead of reacting the two acylatable amino groups in succession with different acylating agents, a mixture of the two different acylating agents may be reacted with the amino-anthraquinone.

The acylation may be carried out by known methods, for example, in an inert medium, such as acetone, nitrobenzene, chlorobenzene, etc., and advantageously in the presence of a tertiary base, such as pyridine or dimethyl-aniline. It is of advantage to carry out the reaction at a raised temperature.

The new dyestuffs, especially after being suitably pasted, if desired, accompanied, by reprecipitation, for example, from sulfuric acid, are very suitable for dyeing and printing hydrophobic fibrous materials, especially fibers of polyesters, for example, polyethylene terephthalates. When applied by the usual dyeing processes, for example, using a dye liquor containing a dispersion of the dyestuff and advantageously a dispersing agent and dyeing either at temperatures close to 100° C., if desired, in the presence of a swelling agent, or under pressure at temperatures above 100° C., they yield pure blue dyeings of especially good fastness to light and sublimation.

An important advantage of the dyestuffs of the invention is that they can be applied from an alkaline bath. This makes them particularly suitable for application by the so-called thermofix process in which the fabric to be dyed is impregnated advantageously at a temperature not exceeding 60° C. with an aqueous dispersion of the dyestuff advantageously containing 1 to 50% of urea and a thickening agent, especially sodium alginate, the impregnated fabric being squeezed in the normal manner. The pressure is advantageously adjusted so that the goods retain 50 to 100% of their dry weight of dye liquor.

The dyestuff is fixed by subjecting the impregnated fabric to a heat treatment at a temperature above 100° C., for example, at a temperature ranging from 180 to 210° C., it being of advantage to dry the fabric prior to this treatment, for example, in a current of warm air.

The thermofix process is of special interest for the dyeing of union fabrics made of a mixture of polyester fibers and cellulosic fibers, especially cotton. In this case, in addition to a dyestuff of the invention, the padding liquor contains a dyestuff suitable for dyeing cotton, for example, a vat dyestuff or, especially, a so-called reactive dyestuff, that is to say, a dyestuff which can be fixed on the cellulosic fiber by the formation of a chemical bond. Such dyestuffs contain, for example, a chlorotriazine or chlorodiazine radical. In the latter case it is of advantage to add to the padding liquor an agent capable of binding acid, for example, an alkali metal carbonate, alkali metal phosphate, alkali metal borate or alkali metal perborate, or a mixture of two or more of these agents. When a vat dyestuff is used, the padded fabric must be treated, after the heat-treatment, with an aqueous alkaline solution of a reducing agent of the kind used in vat dyeing.

The following examples illustrate the invention, the parts and percentages being by weight unless otherwise stated, and the relationship of parts by weight to parts by volume being the same as that of the kilogram to the liter:

Example 1

135 parts of 1:8-diamino - 2:4:5:7 - tetrabromanthraquinone are heated for 4 hours at the boil in 600 parts of amyl alcohol with 180 parts of para-toluene-sulfonamide, 4.5 parts of copper carbonate and 45 parts of potassium acetate. 600 parts of methanol are added to the reaction mixture, the latter is then filtered, and the filter residue is washed successively with methanol and water and dried. There is obtained in good yield 1:8-diamino-2:7-dibromo-4:5-di-(para-toluenesulfonamido) - anthraquinone. The reaction takes about 7 hours in the case of the corresponding 1:5-diamino-compound.

165 parts of the product so obtained are heated at 40 to 50° C. in 900 parts of sulfuric acid of 95% strength until hydrolysis is complete. The hydrolysis is complete when a test portion no longer gives a color change towards green-blue in an organic solvent. The reaction mixture is poured into ice water, filtered, and the filter radical is washed until the washings run neutral, and is then dried. The 1:4:5:8-tetramino - 2:7 - dibromanthraquinone so obtained yields on polyester fibers greenish blue dyeings of excellent fastness to sublimation.

By using 1:8 - diamino - 2:4:5:7 - tetrachloro - anthraquinone, instead of 1:8-diamino-2:4:5:7-tetrabromanthraquinone, 1:4:5:8-tetramino-2:7 - dichloro - anthraquinone is likewise obtained in good yield.

By using 1:5-diamino-2:4:6:8-tetrabromanthraquinone as starting material, there is obtained 1:4:5:8-tetraamino-2:6-dibromanthraquinone.

63.9 parts of the 1:4:5:8-tetramino - 2:7 - dibromanthraquinone obtained as described above are heated for 15 minutes at 100° C. in 225 parts of nitrobenzene with 39 parts of dimethylaniline, 22.8 parts of chloro-formic acid ethyl ester and 15 parts of acetyl chloride. To this mixture are added 450 parts of methyl alcohol, the whole is filtered, and the filter residue is washed with methyl alcohol and dried. The resulting dyestuff of the formula

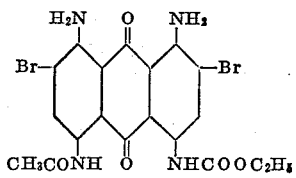

when applied by the thermofix process dyes polyester fibers blue tints of excellent fastness to light, sublimation and alkali.

By using 45.6 parts of chloro-formic acid ethyl ester and no acetyl chloride, a dyestuff having similar dyeing properties is obtained.

By using 1:4:5:8-tetramino-2:6-dibromanthraquinone as starting material there is obtained a dyestuff having similar dyeing properties.

Example 2

42.6 parts of 1:4:5:8 - tetramino - 2:7 - dibromanthraquinone obtained as described in Example 1 are heated for about 3 hours at 120° C. in 500 parts of chlorobenzene with 13.6 parts of chloroformic acid ethyl ester and 13 parts of butyryl chloride. The chlorobenzene is distilled off with steam from a neutralized aqueous suspension. The dyestuff so obtained, when applied by the thermofix process, dyes polyester fibers reddish blue tints of very good fastness to light, alkali and sublimation.

By using 1:4:5:8-tetramino - 2:7 - dichloro-anthraquinone or 1:4:5:8-tetramino-2:6 - dibromanthraquinone as starting material, there are obtained dyestuffs having similar dyeing properties.

By using an equimolecular proportion of chloroformic acid methylester instead of the ethyl ester a dyestuff is obtained which dyes polyester fibers similar shades.

By using an equimolecular proportion of benzoyl chloride, instead of butyryl chloride, there is obtained a dyestuff yielding a somewhat more greenish dyestuff.

By using 1:8-dimethylamino - 4:5 - diamino - 2:7 - dibromanthraquinone as starting material there is obtained a dyestuff yielding a somewhat more reddish tint.

Example 3

85 parts of 1:4:5:8-tetramino - 2:7 - dibromanthraquinone are heated for 1 hour at 60° C. in 500 parts of dimethylaniline with 27.2 parts of chloro-formic acid ethyl ester and 17 parts of acetyl chloride. The reaction mixture is poured into 5000 parts of a mixture of ice-water and 500 parts of concentrated sulfuric acid, the whole is filtered, and the filter residue is washed until the washings run neutral. The dyestuff so obtained, when applied by the high-temperature or thermofix process, dyes polyester fibers blue tints of excellent fastness to light, alkali and sublimation.

Pyridine may be used instead of dimethylaniline, but then the mixture must be heated for about 3 hours at 110 to 115° C., whereupon the acylation product can be precipitated with 750 parts of water.

Example 4

4 parts of 1:4:5:8-tetramino-2:7-dibromanthraquinone are heated for 3 hours at the boil in 40 parts of formic acid. The dyestuff so obtained is precipitated by the addition of 40 parts of water. It dyes polyester fibers blue tints possessing very good properties of fastness.

Example 5

36.7 parts of 1:8-diamino-2:7-dibromo-4:5-di-(para-toluene-sulfamido)-anthraquinone, obtained as described in the first paragraph of Example 1, are introduced at 0 to 5° C., into 300 parts by volume of sulfuric acid of 80% strength, and the whole is stirred for 5 hours at that temperature. The reaction mixture is poured into ice water and filtered. The filter residue is washed until the washings run neutral, and is then dried. There are obtained about 28.45 parts of 1:4:8-triamino-2:7-dibromo-5-paratoluene-sulfonamidoanthraquinone.

The product so obtained is heated for 15 minutes at 100° C. in 300 parts by volume of dimethylaniline with 5 parts of acetyl chloride. The reaction mixture is poured into 1000 parts of a mixture of ice water and 100 parts of concentrated sulfuric acid, the whole is filtered, and the filter residue is washed until the washings run neutral. The dyestuff so obtained, when applied by the high-temperature or thermofix process, dyes polyester fibers blue tints of excellent fastness to light, alkali and sublimation.

Example 6

1 part of an aqueous paste of the dyestuff of the formula

5 is ground with approximately 1 part of dried sulfite cellulose waste liquor in a roller mill to a fine paste having a dyestuff content of about 10%.

100 parts of a fibrous material of polyethylene terephthalate are washed for half an hour in a bath containing, per 1000 parts of water, 1 to 2 parts of the sodium salt of N-benzyl-μ-heptadecylbenzimidazole disulfonic acid and 1 part of a concentrated aqueous solution of ammonia. The material is then entered into a dyebath of 3000 parts of water in which the dyestuff paste obtained as described in paragraph 1 has been dispersed in the presence of 4 parts of the sodium salt of N-benzyl-μ-heptadecylbenzimidazole disulfonic acid. The whole is heated to 130° C. in a pressure vessel and maintained at that temperature for about 1 hour. The material is then well rinsed and, if necessary, washed for half an hour at 60 to 80° C. with a solution containing, per 1000 parts of water, 1 part of the sodium salt of N-benzyl-μ-heptadecylbenzimidazole disulfonic acid. There is obtained a blue dyeing of excellent fastness to sublimation and light.

*Example 7*

14 parts of the dyestuff used in Example 6 are finely ground in a ball mill with 126 parts of a neutral solution of 125 parts of dinaphthylmethane disulfonic acid in 1000 parts of water.

A padding liquor is prepared from the following components:

200 parts of the dyestuff paste described above
300 parts of sodium alginate (1:100)
500 parts of water 1000 parts A polyester fabric is padded with the above padding liquor in such a manner as to increase its weight by 50 to 60%. It is then dried at 60° C. The fabric is then subjected to a heat treatment for 15 to 120 seconds at 200 to 220° C. It is then soaped for 30 minutes at the boil in a solution of 5 grams of soap in 1 liter of water, and is then further treated in the usual manner (rinsing, drying). There is obtained a strong blue dyeing of excellent fastness to light and sublimation.

What is claimed is:
1. The dyestuff of the formula

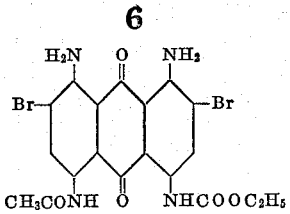

2. The dyestuff of the formula

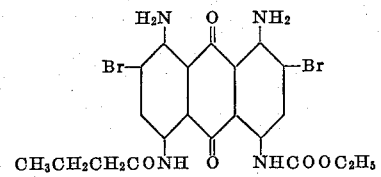

3. The dyestuff of the formula

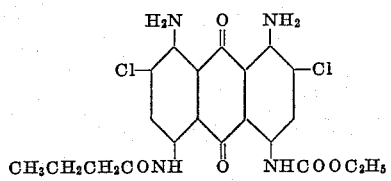

4. The dyestuff of the formula

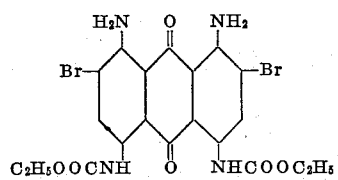

References Cited by the Examiner
UNITED STATES PATENTS 2,063,027  12/1936  Buxbaum _____ 260—377 X
2,063,028  12/1936  Buxbaum et al. ____ 260—377 X LORRAINE A. WEINBERGER, *Primary Examiner.*

H. C. WEGNER, *Assistant Examiner.*